(12) United States Patent
Kim et al.

(10) Patent No.: US 12,132,328 B2
(45) Date of Patent: Oct. 29, 2024

(54) ELECTRONIC DEVICE TO IMPROVE THE EFFICIENCY OF WIRELESS CHARGING

(71) Applicant: Samsung Electronics Co., Ltd., Suwon-si (KR)

(72) Inventors: Yusu Kim, Suwon-si (KR); Dohyeon Kim, Suwon-si (KR); Seho Park, Suwon-si (KR); Byunghwa Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 17/583,773

(22) Filed: Jan. 25, 2022

(65) Prior Publication Data
US 2022/0209581 A1 Jun. 30, 2022

Related U.S. Application Data

(63) Continuation of application No. PCT/KR2021/020022, filed on Dec. 28, 2021.

(30) Foreign Application Priority Data

Dec. 28, 2020 (KR) .................. 10-2020-0185157

(51) Int. Cl.
*H02J 50/12* (2016.01)
*H04B 5/26* (2024.01)
*H04B 5/79* (2024.01)

(52) U.S. Cl.
CPC ............. *H02J 50/12* (2016.02); *H04B 5/26* (2024.01); *H04B 5/79* (2024.01)

(58) Field of Classification Search
CPC .......... H02J 50/12; H02J 50/005; H02J 50/10; H02J 50/402; H02J 50/80; H04B 5/26; H04B 5/79; H01F 27/2804; H01F 38/14
(Continued)

(56) References Cited

U.S. PATENT DOCUMENTS 6,215,307 B1 * 4/2001 Sementchenko .... G01R 33/341
324/318
9,413,191 B2 * 8/2016 Kim ..................... H02J 7/0042
(Continued)

FOREIGN PATENT DOCUMENTS

CN 108766744 A * 11/2018 ............. H01F 38/14
EP 3 474 369 A1 4/2019
(Continued)

OTHER PUBLICATIONS

C.-H. Wu, J.-S. Sun, Y.-T. Lee and H.-J. Hsu, "Wireless charging platform for dual-band magnetic resonance," 2018 7th International Symposium on Next Generation Electronics (ISNE), Taipei, Taiwan, 2018, pp. 1-4 (Year: 2018).*

(Continued)

*Primary Examiner* — M Baye Diao
(74) *Attorney, Agent, or Firm* — Jefferson IP Law, LLP

(57) ABSTRACT

An electronic device to which a wireless charging system is applied is provided. The electronic device includes a battery, a charging circuit, and a circuit board configured to be electrically connected to the charging circuit and include a first portion and a second portion disposed adjacent to the first portion, wherein a first coil, a second coil, and a resonance coil are disposed in the first portion of the circuit board, the first coil being disposed outside the second coil, and the resonance coil being disposed inside the second coil, and wherein a third coil and a resonance capacitor are disposed in the second portion of the circuit board, the resonance capacitor being disposed inside the third coil, and (Continued)

the resonance coil and the resonance capacitor being electrically connected to each other to generate a designated resonance.

22 Claims, 9 Drawing Sheets

(58) Field of Classification Search
USPC .......................................................... 320/108
See application file for complete search history.

(56) References Cited

U.S. PATENT DOCUMENTS

| | | | |
|---|---|---|---|
| 9,438,067 B2 | 9/2016 | Na et al. | |
| 9,892,846 B2* | 2/2018 | Bae | H02J 50/12 |
| 9,991,731 B2 | 6/2018 | Ichikawa | |
| 10,367,548 B2 | 7/2019 | He et al. | |
| 10,469,133 B2 | 11/2019 | Ahn et al. | |
| 10,680,322 B2* | 6/2020 | Lee | H02J 50/12 |
| 10,931,151 B2 | 2/2021 | Baek et al. | |
| 10,998,620 B2* | 5/2021 | Lee | H01Q 1/521 |
| 11,049,648 B2 | 6/2021 | Kwon et al. | |
| 11,115,082 B2* | 9/2021 | Lee | H01Q 1/22 |
| 2014/0191586 A1 | 7/2014 | Ichikawa | |
| 2014/0266030 A1* | 9/2014 | Park | H01F 38/14 |
| | | | 320/108 |
| 2017/0271920 A1 | 9/2017 | Kim et al. | |
| 2019/0214719 A1 | 7/2019 | Lee et al. | |
| 2019/0229771 A1 | 7/2019 | Lee et al. | |
| 2021/0399591 A1* | 12/2021 | Kim | H04L 27/02 |
| 2022/0037936 A1 | 2/2022 | Ettes et al. | |
| 2022/0190621 A1* | 6/2022 | Gu | H02J 7/00034 |

FOREIGN PATENT DOCUMENTS

| | | |
|---|---|---|
| KR | 10-1140338 B1 | 5/2012 |
| KR | 10-1189298 B1 | 10/2012 |
| KR | 10-2017-0010598 A | 2/2017 |
| KR | 10-2017-0058206 A | 5/2017 |
| KR | 10-2017-0108218 A | 9/2017 |
| KR | 10-2018-0005910 A | 1/2018 |
| KR | 10-2018-0097064 A | 8/2018 |
| KR | 10-2210666 B1 | 2/2021 |
| WO | 2020/114926 A1 | 6/2020 |

OTHER PUBLICATIONS

Extended European Search Report dated Mar. 19, 2024, issued in European Patent Application No. 21915750.0.

International Search Report dated Apr. 7, 2022, issued in International Patent Application No. PCT/KR2021/020022.

Khan et al, "Long Range Wireless Power Transfer via Magnetic Resonance", 2017 Progress In Electromagnetics Research Symposium-Fall (PIERS-FALL), Singapore, Nov. 19-22, 2017.

* cited by examiner

ELECTRONIC DEVICE TO IMPROVE THE EFFICIENCY OF WIRELESS CHARGING

CROSS-REFERENCE TO RELATED APPLICATION(S)

This application is a continuation application, claiming priority under § 365(c), of an International application No. PCT/KR2021/020022, filed on Dec. 28, 2021, which is based on and claims the benefit of a Korean patent application number 10-2020-0185157, filed on Dec. 28, 2020, in the Korean Intellectual Property Office, the disclosure of which is incorporated by reference herein in its entirety.

TECHNICAL FIELD

The disclosure relates to an electronic device having a wireless charging system applied thereto.

BACKGROUND ART

Wireless charging or contactless charging technology has been developed and applied to various electronic devices.

The wireless charging technology makes it possible to charge the battery of an electronic device without connecting the same to a wired charger such that, for example, simply by placing a smartphone or a wearable device on a charging pad or charging cradle, the battery thereof can be charged.

The wireless charging technology has also been applied between an electronic device and another electronic device. For example, a first electronic device may operate in a Tx mode in which power is transmitted wirelessly by using power in the battery included in the first electronic device, and a second electronic device may operate in a Rx mode in which power is wirelessly received from the first electronic device.

Various types of wireless charging technologies exist, and a magnetic induction type and a magnetic resonance type, for example, have been introduced. The magnetic induction type has a higher level of charging efficiency than the magnetic resonance type, but may have a narrower charging range in which wireless charging is possible. The magnetic resonance type has a lower level of charging efficiency than the magnetic induction type, but has a wider changing range in which wireless charging is possible, thereby enabling charging at a longer distance.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Electronic devices mass-produced so far support the magnetic induction type only. Therefore, there may be a need for research/development regarding electronic devices supporting both the magnetic induction type and the magnetic resonance type, thereby improving compatibility with charging environments, and capable of utilizing advantages of each of the magnetic induction type and the magnetic resonance type.

Aspects of the disclosure are to address at least the above-mentioned problems and/or disadvantages and to provide at least the advantages described below. Accordingly, an aspect of the disclosure is to provide an electronic device capable of wireless charging by using both the magnetic induction type and the magnetic resonance type, thereby improving the wireless charging efficiency.

Technical problems to be solved by the disclosure are not limited to the above-mentioned technical problems, and other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a battery, a charging circuit, and a circuit board configured to be electrically connected to the charging circuit and include a first portion and a second portion disposed adjacent to the first portion, wherein a first coil, a second coil, and a resonance coil are disposed in the first portion of the circuit board, the first coil being disposed outside the second coil, and the resonance coil being disposed inside the second coil, and wherein a third coil and a resonance capacitor are disposed in the second portion of the circuit board, the resonance capacitor being disposed inside the third coil, and the resonance coil and the resonance capacitor being electrically connected to each other to generate a designated resonance.

In accordance with another aspect of the disclosure, a circuit board on which a coil for wireless charging of an electronic device is disposed is provided. The circuit board includes a first portion and a second portion disposed adjacent to the first portion, wherein a first coil, a second coil, and a resonance coil are disposed in the first portion, the first coil being disposed outside the second coil and the resonance coil being disposed inside the second coil, and wherein a third coil and a resonance capacitor are disposed in the second portion, the resonance capacitor being disposed inside the third coil, and the resonance coil and the resonance capacitor being electrically connected to each other to generate a designated resonance.

Advantageous Effects of Invention

An electronic device according to various embodiments of the disclosure is capable of wireless charging by using both the magnetic induction type and the magnetic resonance type, thereby having excellent compatibility with wireless charging equipment or environment.

An electronic device according to various embodiments may improve charging efficiency during wireless charging.

Various other advantageous effects identified directly or indirectly through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
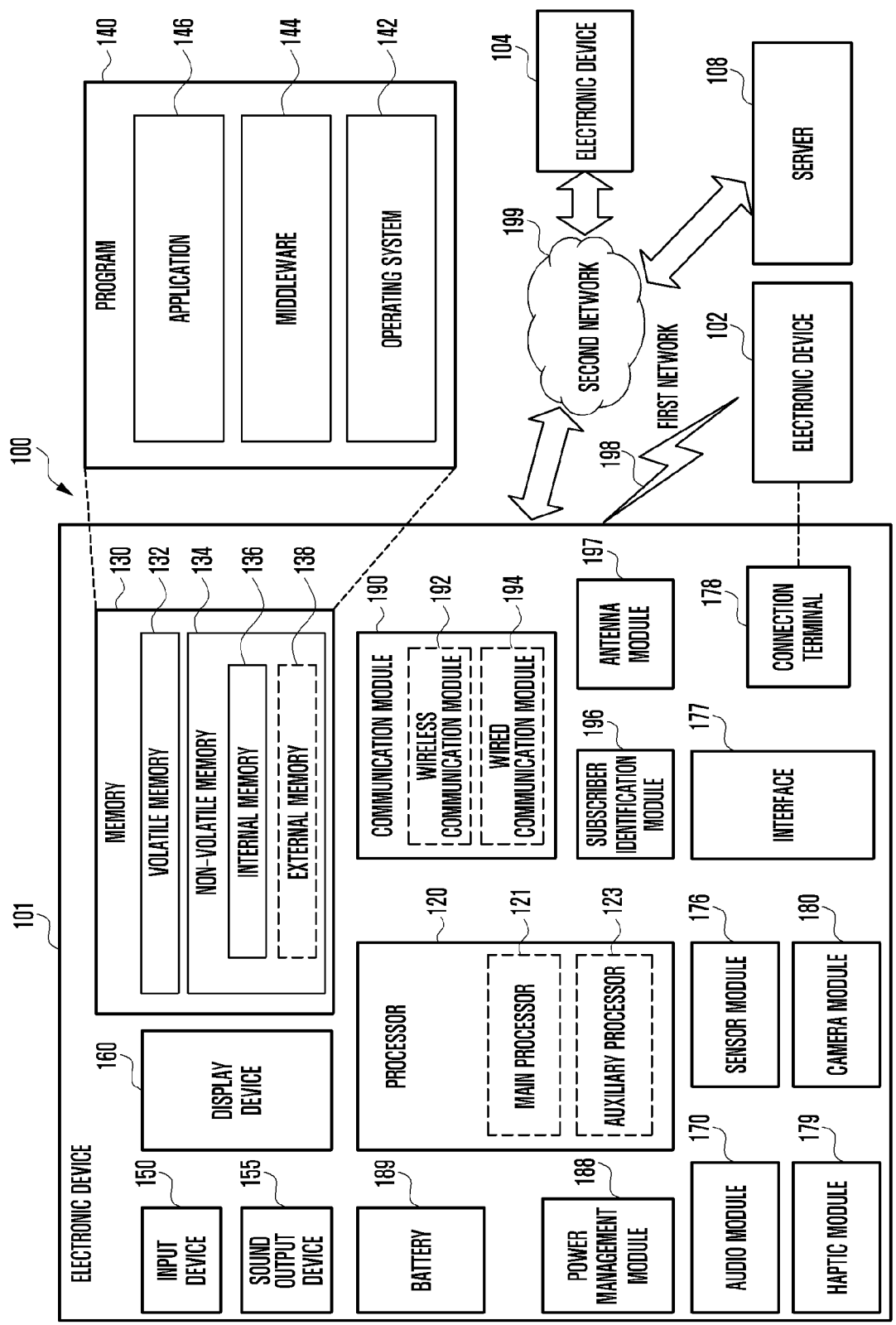
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
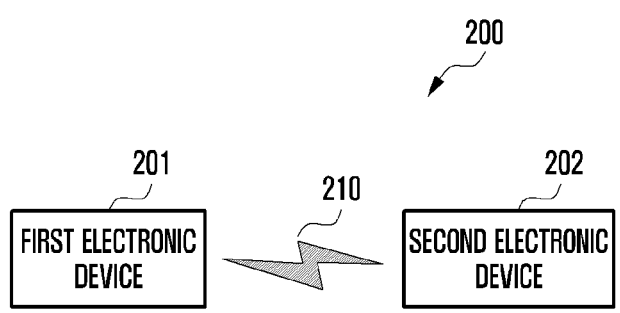
FIG. 2 is a block diagram schematically illustrating a wireless charging system according to an embodiment of the disclosure.

FIG. 2 is a block diagram schematically illustrating a wireless charging system according to an embodiment of the disclosure.

Referring to FIG. 2, a wireless charging system 200 according to various embodiments may include a wireless power receiver (hereinafter, referred to as a first electronic device 201) and/or a wireless power transmitter (hereinafter, referred to as a second electronic device 202).

According to an embodiment, the first electronic device 201 and the second electronic device 202 may perform short-range communication 210 through a magnetic field. According to an embodiment, the short-range communication may include near field communications (NFC), magnetic secure transmission (MST) communications, and/or wireless charging. For example, the first electronic device 201 and the second electronic device 202 may perform NFC communication through a magnetic field. For example, the first electronic device 201 and the second electronic device 202 may perform MST communication. For example, the first electronic device 201 and the second electronic device 202 may transmit or receive power through a wireless charging method.

According to an embodiment, the wireless charging may include at least one of an electromagnetic induction method, a magnetic resonance method, and/or an RF/micro-wave radiation method.

According to various embodiments, in order for the first electronic device 201 to receive power from the second electronic device 202, the wireless charging method of the first electronic device 201 may need to coincide with (match) the wireless charging method of the second electronic device 202. For example, based on the matching between the wireless charging method of the second electronic device 202 and the wireless charging method of the first electronic device 201 in the electromagnetic induction method, the first electronic device 201 may receive power in the electromagnetic induction method. As another example, based on the matching between the wireless charging method of the second electronic device 202 and the wireless charging method of the first electronic device 201 in the magnetic resonance method, the first electronic device 201 may receive power in the magnetic resonance method.

According to various embodiments, in order for the second electronic device 202 and the first electronic device 201 to perform short-range communication (e.g., wireless charging) through a magnetic field, the first electronic device 201 may be disposed to be adjacent to the second electronic device 202. According to an embodiment, the first electronic device 201 may be disposed within a designated distance from the second electronic device 202. For example, the second electronic device 202 may include a designated interface area for performing wireless charging. According to an embodiment, when the first electronic device 201 is disposed within the interface area of the second electronic device 202, the second electronic device 202 may detect the first electronic device 201.

According to various embodiments, the second electronic device 202 may detect the first electronic device 201 by detecting that the first electronic device 201 generates a designated resonance. According to an embodiment, the designated resonance may include resonance of 1 MHz generated from the first electronic device 201. For example, the second electronic device 202 may detect the first electronic device 201 by detecting that the first electronic device 201 generates a resonance of 1 MHz. According to an embodiment, the first electronic device 201 may include a resonator unit 460 (e.g., the resonator of FIG. 4) that generates resonance in a designated band (e.g., 1 MHz) in order to generate the designated resonance. According to various embodiments, the first electronic device 201 may improve the efficiency of wireless charging by optimizing the arrangement of the resonator unit 460. The arrangement of the resonator unit 460 included in the first electronic device 201 will be described later with reference to FIGS. 6 to 8.

Figure 3:
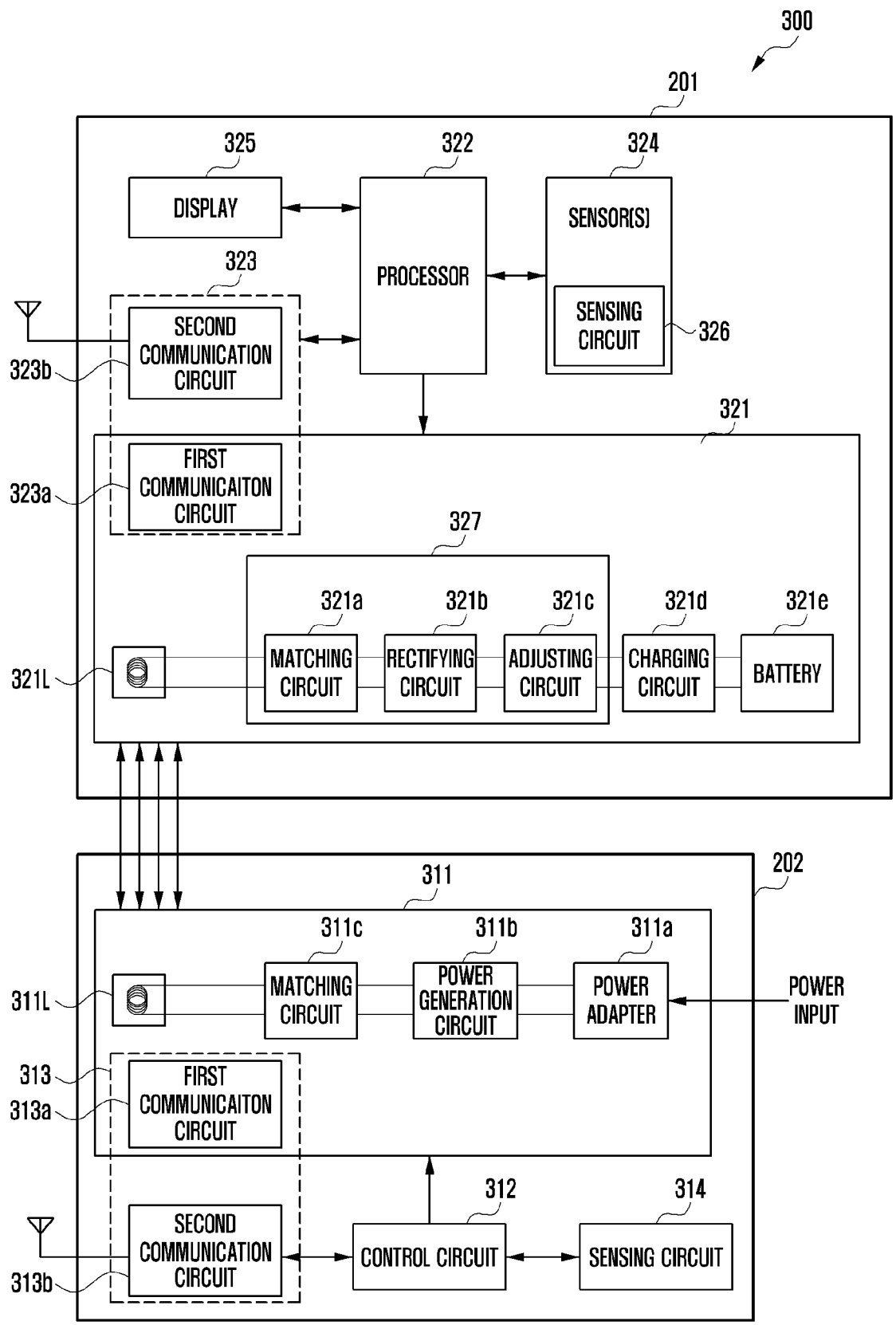
FIG. 3 is a block diagram illustrating a wireless charging system according to an embodiment of the disclosure.

FIG. 3 is a block diagram illustrating a wireless charging system according to an embodiment of the disclosure.

Referring to FIG. 3, the wireless charging system 300 (e.g., the wireless charging system 200 of FIG. 2) may include at least a part similar to or different from the wireless charging system 200 shown in FIG. 2. Hereinafter, in conjunction with FIG. 3, only the features of the wireless charging system 300 that are not described or changed in FIG. 2 will be described.

According to an embodiment, a reception coil 321L of the first electronic device 201 may be disposed to at least partially overlap on a transmission coil 311L of the second electronic device 202. Alternatively, when the reception coil 321L is disposed within a designated distance from the transmission coil 311L of the second electronic device 202, the second electronic device 202 may wirelessly supply power to the first electronic device 201 through the transmission coil 311L.

In various embodiments of the disclosure, the first electronic device 201 may be the same as or similar to the electronic device 101 illustrated in FIG. 1. The second electronic device 202 may be an external device from the viewpoint of the first electronic device 201, for example, may be the same as or similar to the electronic device 102 illustrated in FIG. 1.

In various embodiments of the disclosure, the second electronic device 202 may be the same as or similar to the electronic device 101 illustrated in FIG. 1. The first electronic device 201 may be an external device from the viewpoint of the second electronic device 202, for example, may be the same as or similar to the electronic device 102 illustrated in FIG. 1. In various embodiments of the disclosure, the second electronic device 202 may be the same as or similar to the first electronic device 201. For example, the first electronic device 201 may transmit power to the second electronic device 202.

According to various embodiments, the second electronic device 202 (e.g., the electronic device 101 of FIG. 1) may include a power transmission circuit 311, a control circuit 312 (e.g., the processor 120 of FIG. 1), a communication circuit 313 (e.g., the communication module 190 of FIG. 1), or a sensing circuit 314 (e.g., the sensor module 176 of FIG. 1).

According to various embodiments, the power transmission circuit 311 may include a power adapter 311a that receives an input of power supply (power) from the outside and converts the voltage of the received power supply, a power generation circuit 311b that generates power, or a matching circuit 311c for increasing the efficiency between the transmission coil 311L and the reception coil 321L.

According to various embodiments, the power transmission circuit 311 may include a plurality of power adapters 311a, power generation circuits 311b, transmission coils 311L, or matching circuits 311c so that it is possible to transmit power to a plurality of power reception devices (e.g., a first power reception device and a second power reception device).

According to various embodiments, the control circuit 312 may perform overall control of the second electronic device 202, and may generate various messages required for wireless power transmission to transmit the generated messages to the communication circuit 313. In an embodiment, the control circuit 312 may calculate power (or amount of power) to be transmitted to the first electronic device 201 based on information received through the communication circuit 313. In an embodiment, the control circuit 312 may control the power transmission circuit 311 to transmit power generated by the transmission coil 311L to the first electronic device 201.

According to various embodiments, the communication circuit 313 of the second electronic device 202 may include at least one of a first communication circuit 313a or a second communication circuit 313b. The first communication circuit 313a of the second electronic device 202 may use a frequency that is the same as or adjacent to, for example, the frequency used by the transmission coil 311L for power transmission to communicate with the first communication circuit 323a of the first electronic device 201 (e.g., in-band method).

According to various embodiments, the first communication circuit 313a of the second electronic device 202 may use the transmission coil 311L to communicate with the first communication circuit 323a of the first electronic device 201. Data (or communication signal) generated by the first communication circuit 313a of the second electronic device 202 may be transmitted using the transmission coil 311L. For example, the first communication circuit 313a of the second electronic device 202 may transmit data to the first electronic device 201 using a frequency shift keying (FSK) modulation technique. According to various embodiments, the first communication circuit 313a of the second electronic device 202 may change the frequency of a power signal transmitted through the transmission coil 311L to communicate with the first communication circuit 323a of the first electronic device 201. As another example, the first communication circuit 313a of the second electronic device 202 may allow data to be included in the power signal generated by the power generation circuit 311b, thereby communicating with the first communication circuit 323a of the first electronic device 201. For example, the first communication circuit 313a of the second electronic device 202 may express data by increasing or decreasing the frequency of the power transmission signal.

The second communication circuit 313b may communicate with the second communication circuit 323b of the first electronic device 201 using, for example, a frequency different from the frequency used by the transmission coil 311L for power transmission (e.g., out-band method). For example, the second communication circuit 313b may use any one of various short-range communication methods such as Bluetooth, Bluetooth low energy (BLE), Wi-Fi, and/or near field communication (NFC) to acquire information related to the state of charge (e.g., a voltage value after rectifier, a rectified voltage value {e.g., Vrec} information, current information {e.g., load current, Iout} flowing from a rectifying circuit 321b, various packets, and/or message) from the second communication circuit 323b.

According to various embodiments, the sensing circuit 314 may include at least one or more sensors, and may sense at least one state of the first electronic device 201 using at least one or more sensors.

According to various embodiments, the sensing circuit 314 may include at least one of a temperature sensor, a motion sensor, and a current (or voltage) sensor. For example, the control circuit 312 may detect a temperature state of the second electronic device 202 using the temperature sensor. As another example, the control circuit 312 may detect a motion state of the second electronic device 202 using the motion sensor. As another example, the control circuit 312 may detect a state of an output signal of the second electronic device 202, for example, the magnitude of current, the magnitude of voltage, or the magnitude of power using a current (or voltage) sensor.

According to an embodiment, the current (or voltage) sensor may measure a signal in the power transmission circuit 311. The current (or voltage) sensor may measure a signal in at least a portion of the matching circuit 311c or the power generation circuit 311b. For example, the current (or voltage sensor) may include a circuit for measuring a signal at the front end of the transmission coil 311L.

According to various embodiments, the sensing circuit 314 may be a circuit for foreign object detection (FOD).

According to various embodiments, the first electronic device 201 (e.g., the electronic device 101 of FIG. 1) may include a power receiving circuit 321 (e.g., the power management module 188 of FIG. 1), a processor 322 (e.g., the processor 120 of FIG. 1), a communication circuit 323 (e.g., the communication module 190 of FIG. 1), at least one sensor 324 (e.g., the sensor module 176 of FIG. 1), a display 325 (e.g., the display module 160 of FIG. 1), or a sensing circuit 326. For example, the first electronic device 201 may be the same as or similar to the second electronic device 202.

According to various embodiments, the power receiving circuit 321 may include a receiving coil 321L that wirelessly receives power from the second electronic device 202, an Rx IC 327, a charging circuit (e.g., a PMIC, a charger, a switched capacitor, or voltage divider) 321d, or battery 321e (e.g., the battery 189). In an embodiment, the Rx IC 327 may include a matching circuit 321a connected to the receiving coil 321L, a rectifying circuit 321b for rectifying received alternate current (AC) power to direct current (DC), or an adjusting circuit 321c for adjusting a charging voltage (e.g., low dropout regulator (LDO)).

According to various embodiments, the receiving coil 321L may include a first coil 411 (e.g., the first coil 411 of FIG. 5A) for wireless charging in a magnetic resonance method, and/or a second coil 421 (e.g., the second coil 421 of FIG. 5A) for wireless charging in an electromagnetic induction method.

According to an embodiment, the first coil 411 may be designed to be driven in a designated high frequency band. According to an embodiment, the designated high frequency band may include about 6.78 MHz. For example, the first coil 411 may be designed to operate at about 6.78 MHz for wireless charging in the magnetic resonance method. According to various embodiments, the designated high frequency band may include at least one of about 1 MHz, about 3.28 MHz, about 6.78 MHz, about 13.56 MHz, or about 80 kHz.

According to an embodiment, the second coil 421 may be designed to be driven in a designated low frequency band. According to an embodiment, the designated low frequency band may include about 87 kHz to about 200 kHz for wireless power consortium (WPC) and 500 kHz or less for power matters alliance (PMA). For example, the second coil 421 may be designed to operate at about 87 kHz to about 200 kHz or about 500 kHz or less for wireless charging in the electromagnetic induction method.

According to various embodiments, the processor 322 may perform overall control of the first electronic device 201, may generate various messages required for wireless power reception, and may transmit the generated messages to the communication circuit 323.

According to various embodiments, the communication circuit 323 of the first electronic device 201 may include at least one of a first communication circuit 323a and a second communication circuit 323b. The first communication circuit 323a of the first electronic device 201 may communicate with the second electronic device 202 through the receiving coil 321L.

According to various embodiments, the first communication circuit 323a of the first electronic device 201 may communicate with the first communication circuit 313a of the second electronic device 202 using the receiving coil 321L. Data (or communication signal) generated by the first communication circuit 323a of the first electronic device 201 may be transmitted using the receiving coil 321L. For example, the first communication circuit 323a of the first electronic device 201 may transmit data to the second electronic device 202 using an amplitude shift keying (ASK) modulation technique. The second communication circuit 323b may communicate with the second electronic device 202 using any one of various short-range communication methods such as Bluetooth, BLE, Wi-Fi, and NFC.

In various embodiments of the disclosure, the packet, information, or data transmitted and received by the second electronic device 202 and the first electronic device 201 may use at least one of the first communication circuit 323a or the second communication circuit 323b of the first electronic device 201.

According to various embodiments, the at least one sensor 324 may include at least some of a current/voltage sensor, a temperature sensor, an illuminance sensor, or an acceleration sensor. In an embodiment, the at least one sensor 324 may be substantially the same as or a separate component from the sensor module 176 of FIG. 1.

According to various embodiments, the display 325 may display various information related to wireless power transmission/reception.

According to various embodiments, the sensing circuit 326 may detect the second electronic device 202 by detecting a search signal from the second electronic device 202 or received power. The sensing circuit 326 may detect a signal change at an input/output terminal of the receiving coil 321L, the matching circuit 321a, or the rectifying circuit 321b, due to the signal of the receiving coil 321L generated by the signal output from the second electronic device 202. According to various embodiments, the sensing circuit 326 may be included in the power receiving circuit 321.

Figure 4:
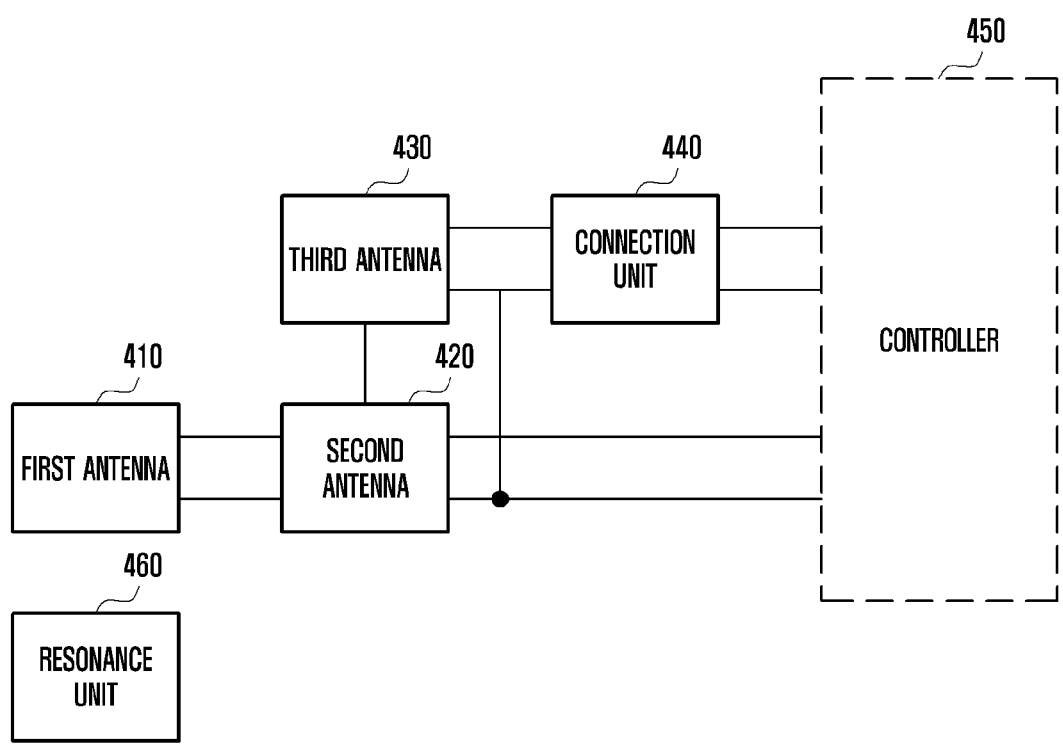
FIG. 4 is a schematic block diagram illustrating a first electronic device according to an embodiment of the disclosure.

FIG. 4 is a schematic block diagram illustrating the first electronic device 201 according to an embodiment of the disclosure.

Figure 5A:
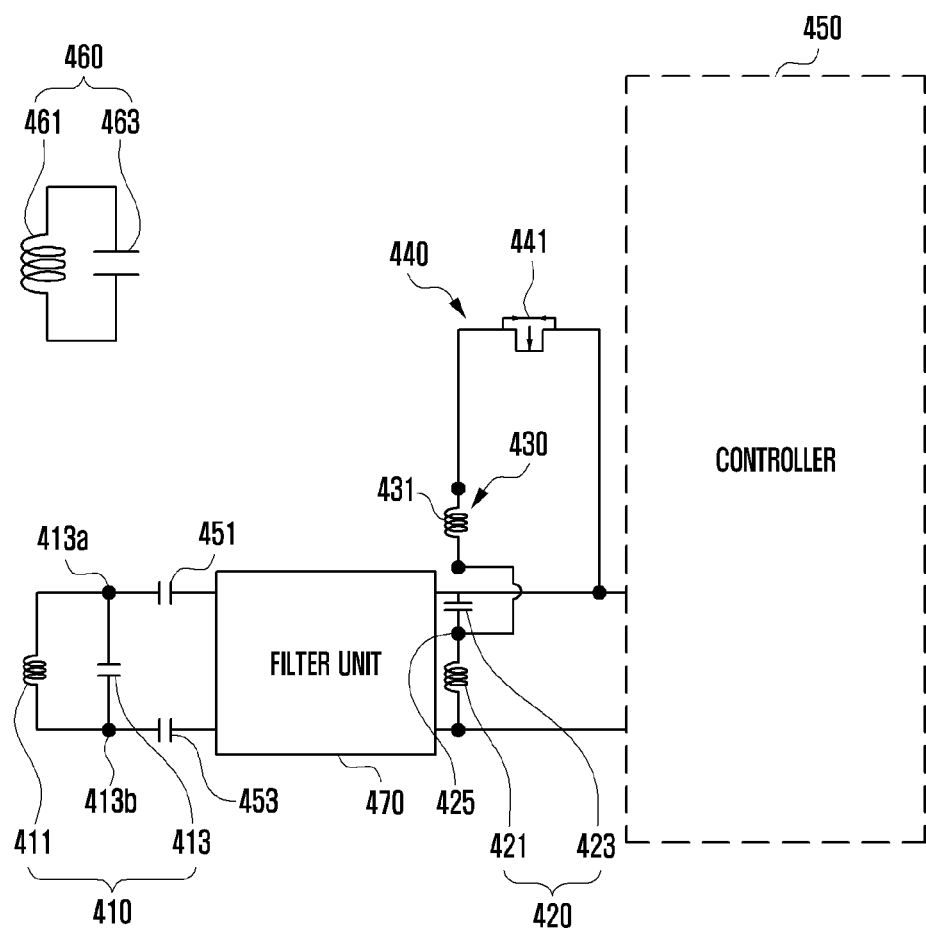
FIG. 5A is a circuit diagram illustrating a power receiver of a first electronic device according to an embodiment of the disclosure.

FIG. 5A is a circuit diagram illustrating the power receiver of a first electronic device according to an embodiment of the disclosure. For example, the circuit diagram shown in FIG. 5A may include at least a portion of the receiving coil 321L and the receiving control circuit 312 of FIG. 3.

Figure 5B:
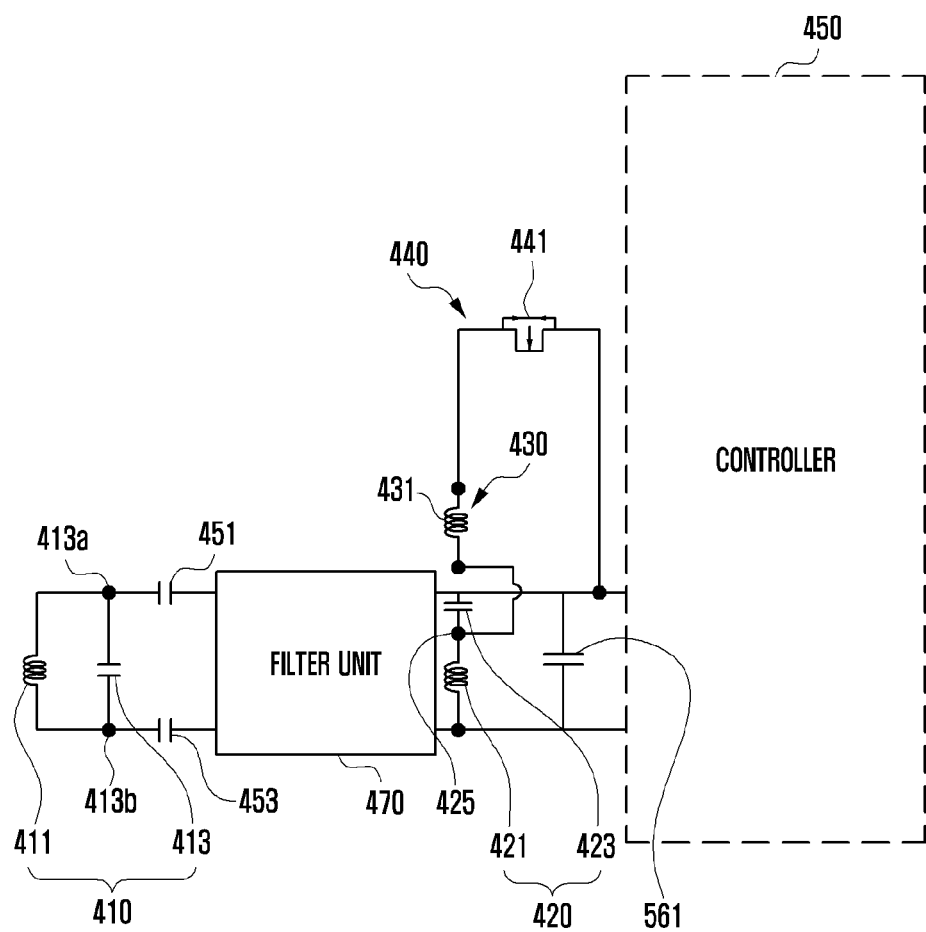
FIG. 5B is a circuit diagram illustrating a power receiver of a first electronic device according to an embodiment of the disclosure.

FIG. 5B is a circuit diagram illustrating the power receiver of a first electronic device according to an embodiment of the disclosure.

Referring to FIGS. 4 and 5A, the first electronic device 201 may include a first antenna 410, a second antenna 420, a third antenna 430, and/or a connection unit 440, and they may be electrically connected to a controller 450.

According to an embodiment, the controller 450 may include an embodiment in which the controller 450 is at least partially similar to or different from the power receiving circuit 321 illustrated in FIG. 3. For example, the controller 450 may include at least some of the Rx IC 327 and/or the charging circuit (e.g., a PMIC, a charger, a switched capacitor, or a voltage divider) 321d shown in FIG. 3.

According to an embodiment, the first antenna 410 may include a first coil 411 and/or a first capacitor 413 for wireless charging in a magnetic resonance method. According to an embodiment, the first capacitor 413 may be connected in parallel to the first coil 411. According to an embodiment, the first capacitor 413 may be disposed for impedance matching between the first coil 411 and the controller 450. According to an embodiment, the first coil 411 may be designed to be driven in a designated high frequency band. According to an embodiment, the designated high frequency band may include 6.78 MHz. For example, the first coil 411 may be designed to operate at about 6.78 MHz for wireless charging in the magnetic resonance method.

According to an embodiment, the second antenna 420 may be disposed between the first antenna 410 and the controller 450 and may be connected to the first antenna 410 in parallel. According to an embodiment, the second antenna 420 may include a second coil 421 and/or a second capacitor 423 for wireless charging using the electromagnetic induction method. According to an embodiment, the second capacitor 423 may be connected in series to the second coil 421. According to an embodiment, the second capacitor 423 may be disposed for impedance matching between the second coil 421 and the controller 450. According to an embodiment, the second coil 421 may be designed to be driven in a designated low frequency band. According to an embodiment, the designated low frequency band may include about 87 kHz to about 200 kHz for WPC and about 500 kHz or less for PMA. For example, the second coil 421 may be designed to operate at about 87 kHz to about 200 kHz or about 500 kHz or less for wireless charging in the electromagnetic induction method.

According to an embodiment, the third antenna 430 may include a third coil 431 for MST communication. According to an embodiment, the third coil 431 may be connected to a node 425 between the second coil 421 and the second capacitor 423, thereby being connected in series with the second coil 421. According to an embodiment, the third coil 431 may be driven together with the second coil 421 by a switching operation of the connection unit 440. For example, the second antenna 420 and the third antenna 430 may perform electromagnetic induction wireless charging or MST communication by the switching operation of the connection unit 440.

According to an embodiment, the connection unit 440 may include at least one switching element 441 connecting the second antenna 420 and the third antenna 430 to each other. According to an embodiment, the switching element 441 may connect the second antenna 420 and the third antenna 430 to each other based on a control signal for controlling whether MST communication is activated. According to an embodiment, when the second antenna 420 and the third antenna 430 are connected to each other by the connection unit 440, a current path passing through the second antenna 420 and the third antenna 430 may be formed from the controller 450.

According to an embodiment, the first electronic device 201 may further include a filter unit 470 for reducing noise. Referring to FIG. 5A, the filter unit 470 is illustrated as being disposed between the first antenna 410 and the second antenna 420, but the position of the filter unit 470 may be variously modified or changed. In some embodiments, the first electronic device 201 may not include the filter unit 470.

According to an embodiment, the first electronic device 201 may further include at least one capacitor 451 and 453 disposed between the first antenna 410 and the controller 450. According to an embodiment, the at least one capacitor 451 and 453 may include a capacitor 451 disposed between one end 413a of the first coil 411 and the controller 450, and/or a capacitor 453 disposed between the other end 413b of the first coil 411 and the controller 450.

According to an embodiment, the first electronic device 201 may further include a resonance unit 460 that generates a designated resonance. According to an embodiment, the resonance unit 460 may be designed to be driven independently of the first antenna 410, the second antenna 420, or the third antenna 430 and to generate the designated resonance. According to an embodiment, the resonance unit 460 may be designed not to be electrically connected to the first antenna 410, the second antenna 420, or the third antenna 430. According to an embodiment, the resonance unit 460 may include a resonance coil 461 and a resonance capacitor 463 connected to the resonance coil 461, and the resonance coil 461 and the resonance coil 461 may be designated not to be electrically connected to the first antenna 410, the second antenna 420, or the third antenna 430.

According to an embodiment, the resonance designated by the resonance unit 460 may include resonance of about 1 MHz. For example, the second electronic device 202 may detect the first electronic device 201 by detecting that the resonance unit 460 of the first electronic device 201 generates resonance of about 1 MHz. According to various embodiments, the first electronic device 201 may improve the efficiency of wireless charging by optimizing the arrangement of the resonance unit 460. The arrangement of the resonance unit 460 included in the first electronic device 201 will be described later with reference to FIGS. 6 to 8.

Referring to FIG. 5B, the resonance unit 460 illustrated in FIG. 5A is omitted, and the power receiver of the first electronic device 201 according to the comparative example may include a resonance capacitor 561 that is disposed between the second coil 421 and the controller 450 and is connected in parallel with the second coil 421. The resonance capacitor 561 according to the comparative example may perform the function and role of the resonance unit 460 illustrated in FIG. 5A. For example, the resonance capacitor 561 according to the comparative example may be designed to generate a resonance of about 1 MHz.

Compared to the comparative example illustrated in FIG. 5B, the first electronic device 201 according to various embodiments may improve the efficiency of wireless charging or may reduce a loss of a power signal. For example, in the circuit of the power receiver according to the comparative example shown in FIG. 5B, the resonance capacitor 561 may be disposed in a path through which the power signal received through the first antenna 410 is transmitted to the controller 450, whereby a loss may occur. For example, the resonance capacitor 561 may lower the impedance when the first coil 411 operates in a band of about 6.78 MHz. Accordingly, the loss of the power signal may be reduced by about 20%. Unlike the comparative example shown in FIG. 5B, in the first electronic device 201 according to various embodiments, the resonance capacitor 561 connected in parallel with the second coil 421 is omitted, and the above-mentioned loss can be reduced by disposing the resonance unit 460 generating resonance of about 1 MHz not to be electrically connected to the first antenna 410, the second antenna 420, or the third antenna 430.

Figure 6:
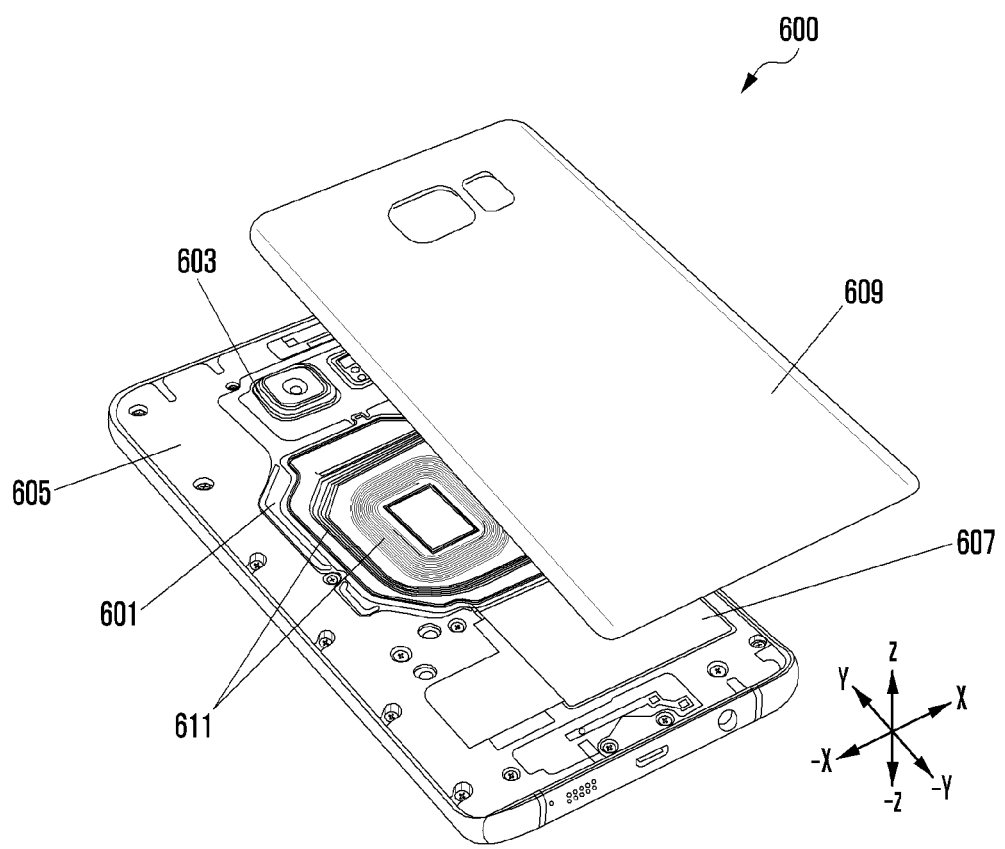
FIG. 6 is a perspective view illustrating a rear surface of a first electronic device according to an embodiment of the disclosure.

FIG. 6 is a perspective view illustrating a rear surface of a first electronic device according to an embodiment of the disclosure. For example, FIG. 6 illustrates a state in which a cover 609 located on the rear surface of the first electronic device 600 is detached.

The first electronic device 600 illustrated in FIG. 6 may include an embodiment in which the first electronic device 600 is at least partially similar to or different from the first electronic device 201 illustrated in FIGS. 2 to 4, and 5A. Hereinafter, in conjunction with FIG. 6, only the features of the first electronic device 201 that are not described or changed in FIGS. 2 to 4, and 5A will be described.

Referring to FIG. 6, a first electronic device 600 (e.g., the electronic device 101 of FIG. 1) according to an embodiment may include a housing 605 for accommodating and fixing components. According to an embodiment, a circuit board 601 on which one or more coils 611 (e.g., the first coil 411, the second coil 421, and/or the third coil 431 of FIG. 5A) are disposed, a camera 603 (e.g., the camera module 180 of FIG. 1), and/or a battery 607 (e.g., the battery 189 of FIG. 1) may be disposed in the housing 605.

According to an embodiment, the circuit board 601 on which the coil 611 is disposed may be positioned at the center of the first electronic device 600 when the first electronic device 600 with the cover 609 removed is viewed from the rear. According to an embodiment, the circuit board 601 on which the coil 611 is disposed may be disposed at the center of the first electronic device 600 when the first electronic device 600 with the cover 609 removed is viewed from the rear, and a portion of the circuit board 601 may be disposed to extend in a third direction (e.g., Y direction of FIG. 6) from the center of the circuit board 601. According to an embodiment, a portion of the circuit board 601 may extend in the third direction (e.g., Y direction of FIG. 6) from the center of the first electronic device 600, and the portion extending in the third direction (e.g., the Y direction of FIG. 6) of the circuit board 601 may be disposed adjacent to the camera 603. According to an embodiment, in the portion extending in the third direction (e.g., Y direction of FIG. 6) of the circuit board 601, at least a portion of the coil 611 may be disposed.

According to an embodiment, the circuit board 601 may be implemented in the form of a printed circuit board (PCB), a flexible PCB (FPCB), or a rigid-flex PCB (RFPCB).

Figure 7:
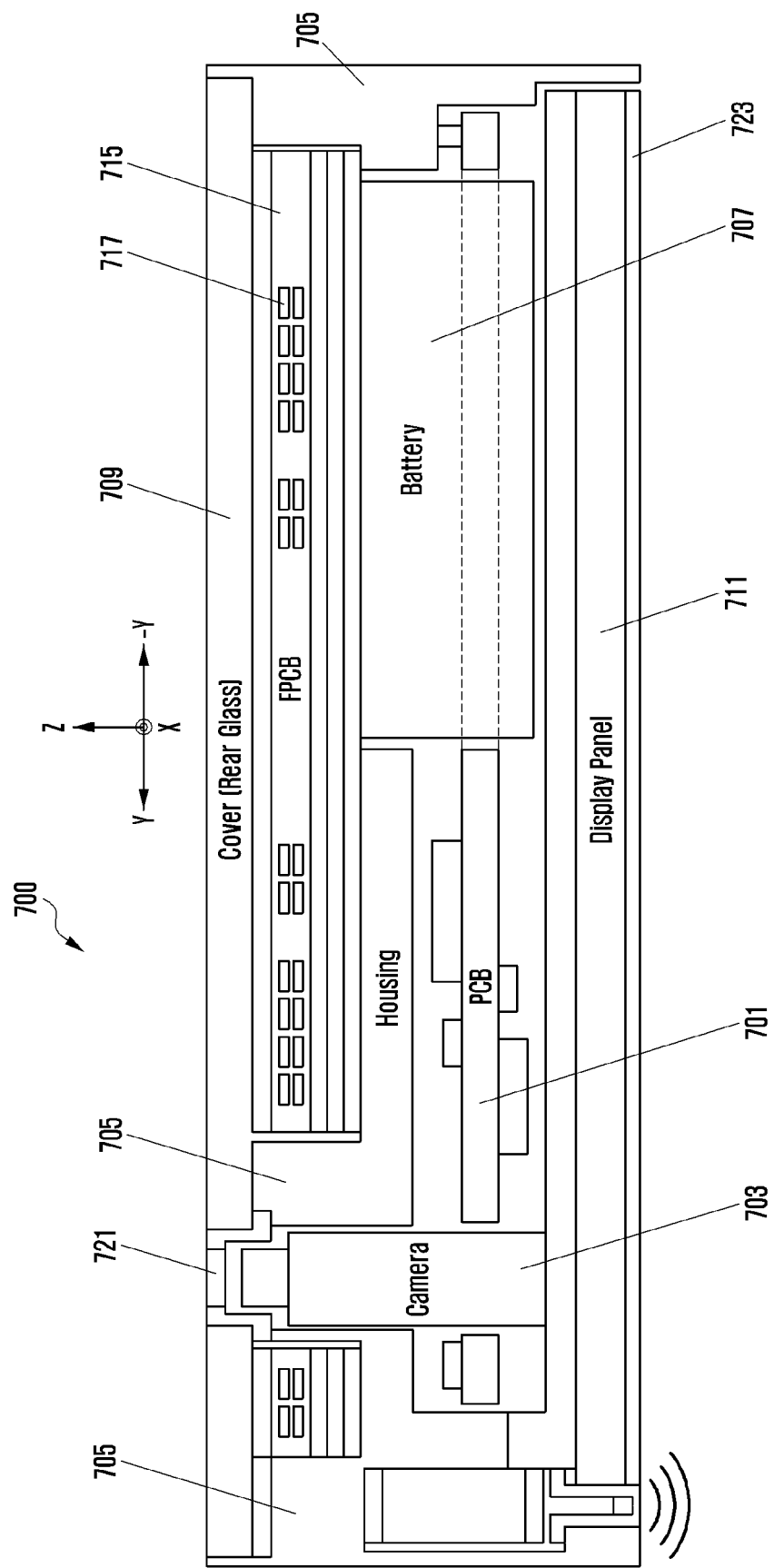
FIG. 7 is a schematic cross-sectional view illustrating a first electronic device according to an embodiment of the disclosure.

FIG. 7 is a schematic cross-sectional view illustrating a first electronic device according to an embodiment of the disclosure.

A first electronic device 700 illustrated in FIG. 7 may include an embodiment in which the first electronic device 700 is at least partially similar to or different from the first electronic devices 201 and 600 illustrated in FIGS. 2 to 4, 5A, and 6. Hereinafter, in conjunction with FIG. 7, only the features of the first electronic device 700 that are not described or changed in FIGS. 2 to 4, 5A, and 6 will be described.

Referring to FIG. 7, a first electronic device 700 (e.g., the electronic device 101 of FIG. 1) according to an embodiment may include a housing 705 (e.g., the housing 605 of FIG. 6) for accommodating and fixing one or more components and/or a cover 709 (e.g., the cover 609 of FIG. 6) coupled to the housing 705 on the rear surface of the first electronic device 700. The Components may include, for example, a display panel 711, a first board 701, a battery 707, a camera 703, or a circuit board 715 (e.g., the circuit board 601) which are positioned inside the housing 705.

The display panel 711 may be attached to, for example, a glass sheet (window cover) 723 positioned on the front surface of the first electronic device 201. According to an embodiment, the display panel 711 may be integrally provided with a touch sensor or a pressure sensor. According to another embodiment, the touch sensor or the pressure sensor may be separated from the display panel.

On the first substrate 701, for example, a communication module (e.g., the communication module 190 of FIG. 1) or a processor (e.g., the processor 120 of FIG. 1) may be disposed. According to an embodiment, the first substrate 701 may be implemented using at least one of a printed circuit board (PCB) or a flexible printed circuit board (FPCB). According to an embodiment, the first substrate 701 may provide a ground for grounding a loop antenna 717 (e.g., the first coil 411, the second coil 421, and the third coil 431 of FIG. 5A) disposed on the FPCB 715.

The cover 709 may include, for example, a conductive area made of a conductive material or a non-conductive area made of a non-conductive material. For example, the cover 709 may be divided into a conductive area and a non-conductive area positioned on one or both sides of the conductive area. According to an embodiment, at least one opening 721 for exposing some components of the first electronic device 700 to the outside may be provided on the cover 709. For example, the cover 709 may include an opening 721 for exposing a camera 703, a flash, or a sensor (e.g., a fingerprint sensor).

According to an embodiment, the FPCB 715 may include one or more loop antennas 717, and may be positioned to be electrically insulated from the conductive area of the cover 709.

According to an embodiment, the one or more loop antennas 717 may be provided to be the same type. For example, the one or more loop antennas 717 may be provided as a planar type of coil. According to another embodiment, some of the one or more loop antennas 717 may be provided as a planar type of coil, and the others thereof may be provided as a solenoid type of coil.

According to various embodiments, some of the one or more loop antennas 717 may be configured to generate a magnetic field in a direction (Z-axis direction) perpendicular to the rear surface (XY plane) of the first electronic device 700, and the others thereof may be configured to generate a magnetic field in a horizontal direction on the rear surface (XY plane) of the first electronic device 700.

An electronic device (e.g., the first electronic device 201 of FIG. 3) according to various embodiments of the disclosure may include a battery (e.g., the battery 321e of FIG. 3), a charging circuit (e.g., the charging circuit 321d of FIG. 3), and a circuit board (e.g., the circuit board 800 of FIG. 8) configured to be electrically connected to the charging circuit 321d and include a first portion (e.g., a first portion 810 of FIG. 8) and a second portion (e.g., the second portion 820 of FIG. 8) disposed adjacent to the first portion 810, wherein a first coil (e.g., the first coil 411 of FIG. 8), a second coil (e.g., the second coil 421 of FIG. 8), and a resonance coil (e.g., the resonance coil 461 of FIG. 8) may be disposed in the first portion 810 of the circuit board 800, the first coil 411 being disposed outside the second coil 421, and the resonance coil 461 being disposed inside the second coil 421, and wherein a third coil (e.g., the third coil 431 of FIG. 8) and a resonance capacitor (e.g., the resonance capacitor 463 of FIG. 8) may be disposed in the second portion 820 of the circuit board 800, the resonance capacitor 463 being disposed inside the third coil 431 and the resonance coil 461 and the resonance capacitor 463 being electrically connected to each other to generate a designated resonance.

According to an embodiment, the first coil 411 may be a first antenna for wireless charging in a magnetic resonance method, and the second coil 421 may be a second antenna for wireless charging in an electromagnetic induction method.

According to an embodiment, a distance between innermost patterns of the resonance coil 461 and the second coil 421 may be greater than 2 mm and less than 30 mm.

According to an embodiment, the designated resonance may include resonance of 1 MHz.

According to an embodiment, the resonance coil 461 may be disposed adjacent to the center of the second coil 421.

According to an embodiment, the first coil 411 may operate in a designated high frequency band for wireless charging in the magnetic resonance method, and the second coil 421 may operate in a designated low frequency band for wireless charging in the electromagnetic induction method.

According to an embodiment, the circuit board 800 may further include a fourth coil 831 configured to be disposed outside the third coil 431 and operate as an antenna for NFC communication, wherein the third coil 431 is a third antenna for MST communication and a distance between innermost patterns of the third coil 431 and the fourth coil 831 may be greater than or equal to 1 mm.

According to an embodiment, a distance between innermost patterns of the second coil 421 and the first coil 411 may be greater than or equal to 2 mm.

According to an embodiment, the resonance coil 461 and the resonance capacitor 463 may not be electrically connected to the first coil 411 to the third coil 431.

According to an embodiment, the circuit board 800 may further include at least one line that is disposed to extend from the first portion 810 to the second portion 820 and connect the resonance coil 461 and the resonance capacitor 463.

The circuit board 800 on which a coil for wireless charging of the first electronic device 201 is disposed according to various embodiments of the disclosure may include the first portion 810 and the second portion 820 disposed adjacent to the first portion 810, wherein the first coil 411, the second coil 421, and the resonance coil 461 may be disposed in the first portion 810, the first coil 411 being disposed outside the second coil 421 and the resonance coil 461 being disposed inside the second coil 421, and wherein the third coil 431 and the resonance capacitor 463 may be disposed in the second portion 820, the resonance capacitor 463 being disposed inside the third coil 431 and the resonance coil 461 and the resonance capacitor 463 being electrically connected to each other to generate the designated resonance.

According to an embodiment, the first coil 411 may be a first antenna for wireless charging using a magnetic resonance method, and the second coil 421 may be a second antenna for wireless charging using an electromagnetic induction method.

According to an embodiment, a distance between innermost patterns of the resonance coil 461 and the second coil 421 may be greater than 2 mm and less than 30 mm.

According to an embodiment, the designated resonance may include a resonance of 1 MHz.

According to an embodiment, the resonance coil 461 may be disposed adjacent to the center of the second coil 421.

According to an embodiment, the first coil 411 may operate in a designated high frequency band for wireless charging using the magnetic resonance method, and the second coil 421 may operate in a designated low frequency band for wireless charging using the electromagnetic induction method.

According to an embodiment, the circuit board 800 may further include a fourth coil 831 configured to be disposed outside the third coil 431 and operate as an antenna for NFC communication, wherein the third coil 431 is a third antenna for MST communication and a distance between innermost patterns of the third coil 431 and the fourth coil 831 may be greater than or equal to 1 mm.

According to an embodiment, a distance between innermost patterns of the second coil 421 and the first coil 411 may be greater than or equal to 2 mm.

According to an embodiment, the resonance coil 461 and the resonance capacitor 463 may not be electrically connected to the first coil 411 to the third coil 431.

According to an embodiment, the circuit board 800 may further include at least one line that is disposed to extend from the first portion 810 to the second portion 820 and connect the resonance coil 461 and the resonance capacitor 463.

Figure 8:
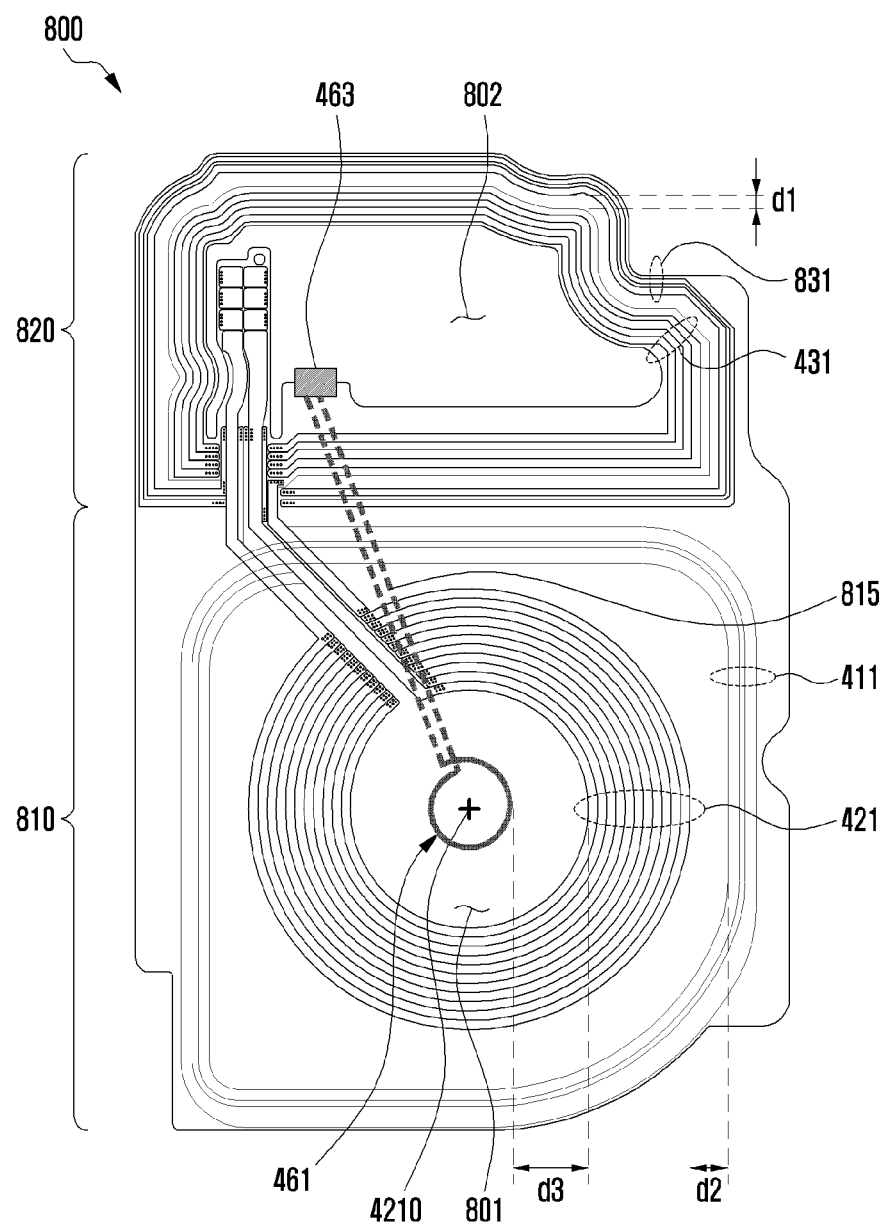
FIG. 8 is a plan view illustrating a portion of a circuit board on which a coil is formed according to an embodiment of the disclosure.

FIG. 8 is a plan view illustrating a portion of a circuit board on which a coil is formed according to an embodiment of the disclosure.

The circuit board 800 illustrated in FIG. 8 may include an embodiment in which the circuit board 800 is at least partially similar to or different from the circuit board 601 illustrated in FIG. 6 and/or the FPCB 715 illustrated in FIG. 7. Hereinafter, in conjunction with FIG. 8, features of the circuit board 800 that are not described or changed in FIGS. 6 and 7 will be mainly described.

Referring to FIG. 8, the circuit board 800 of the first electronic device 201 according to an embodiment may be electrically connected to a board (e.g., the first board 701 of FIG. 7) in a connector method.

According to an embodiment, the circuit board 800 may be implemented in the form of a printed circuit board (PCB), a flexible PCB (FPCB), or a rigid-flexible PCB (RFPCB).

According to an embodiment, the circuit board 800 may include a plurality of coils 411, 421, 431, and 831 electrically connected to a substrate (e.g., the first substrate 701 of FIG. 7) through a connector. According to an embodiment, the plurality of coils 411, 421, 431, and 831 may be electrically connected to a charging circuit (e.g., the Rx IC 327 and/or the charging circuit 321*d* of FIG. 3) or a communication module (e.g., the communication module 190 of FIG. 1) to operate as an antenna for short-range communication. According to an embodiment, the plurality of coils 411, 421, 431, and 831 may operate as an antenna for wireless charging, an antenna for MST communication, and/or an antenna for NFC communication as the short-range communication.

According to an embodiment, the circuit board 800 may further include a resonance coil 461 and/or a resonance capacitor 463 that is not electrically connected to a connector and generates resonance of a designated band.

According to an embodiment, the circuit board 800 may include the first portion 810 and/or the second portion 820. According to an embodiment, the first portion 810 and the second portion 820 may be disposed adjacent to each other. For example, in the circuit board 800, the boundary of the first portion 810 and the boundary of the second portion 820 may be disposed adjacent to each other. According to an embodiment, a connector electrically connected to the board may be disposed on the second portion 820 of the circuit board 800. According to an embodiment, the second portion 820 of the circuit board 800 may be disposed adjacent to a camera of the second electronic device 202 (e.g., the camera 703 of FIG. 7).

According to an embodiment, in the first portion 810 of the circuit board 800, a second coil 421 (e.g., the second coil 421 of FIG. 5A) for wireless charging using an electromagnetic induction method may be disposed. For example, the second coil 421 may be designed to operate at about 87 kHz to about 200 kHz or about 500 kHz or less for wireless charging using the electromagnetic induction method.

According to an embodiment, a first coil 411 (e.g., the first coil 411 of FIG. 5A) for wireless charging using a magnetic resonance method may be disposed outside the second coil 421. For example, the first coil 411 may be designed to operate at about 6.78 MHz for wireless charging using the magnetic resonance method.

According to an embodiment, in the inner side 801 of the second coil 421, a resonance coil 461 (e.g., the resonance coil 461 of FIG. 5A) for generating resonance designated for an external device (e.g., the second electronic device 202 of FIG. 2) to detect the first electronic device 201. According to an embodiment, the resonance coil 461 may be connected to a resonance capacitor 463 (e.g., the resonance capacitor 463 of FIG. 5A) disposed in the second portion 820 of the circuit board 800, so that the resonance coil 461 may be designated to generate a resonance of 1 MHz. According to an embodiment, the resonance coil 461 may be disposed adjacent to a center 4210 of the second coil 421.

According to an embodiment, a distance d3 between innermost patterns of the resonance coil 461 and the second coil 421 may be designed to be greater than about 2 mm and less than about 30 mm. Accordingly, it is possible to reduce a loss of a power signal due to coupling between the resonance coil 461 and the second coil 421. For example, since the resonance coil 461 operates at about 1 MHz and the second coil 421 operates at about 100 kHz, the loss of the power signal due to coupling at the separation distance may be negligible.

According to an embodiment, the circuit board 800 may include at least one line 815 that is disposed to extend from the first portion 810 to the second portion 820 and connects the resonance coil 461 and the resonance capacitor 463.

According to an embodiment, a distance d2 between innermost patterns of the second coil 421 and the first coil 411 may be designed to be greater than or equal to about 2 mm. Accordingly, it is possible to reduce a loss of a power signal due to coupling between the first coil 411 and the second coil 421.

According to an embodiment, a connector electrically connected to the board may be disposed on the second portion 820 of the circuit board 800. According to an embodiment, the second portion 820 of the circuit board 800 may be disposed adjacent to a camera of the first electronic device 201 (e.g., the camera 703 of FIG. 7).

According to an embodiment, the third coil 431 for MST communication may be disposed on the second portion 820 of the circuit board 800. According to an embodiment, a connection between the third coil 431 and the second coil 421 may be controlled by a switching operation of a connection unit (e.g., the connection unit 440 of FIG. 5A), and may perform wireless charging in an electromagnetic induction method or perform MST communication.

According to an embodiment, the fourth coil 831 for NFC communication may be disposed outside the third coil 431.

According to an embodiment, the resonance capacitor 463 may be disposed on the inner side 802 of the third coil 431. According to an embodiment, the resonance capacitor 463 may be electrically connected to the resonance coil 461 to generate a resonance in a designated band.

According to an embodiment, the distance d1 between the innermost patterns of the third coil 431 and the fourth coil 831 may be designed to be greater than or equal to about 1 mm. Accordingly, it is possible to reduce a loss of a power signal due to coupling between the third coil 431 and the fourth coil 831.

According to various embodiments, the position of the fourth coil 831 may be variously changed. For example, although not shown, the fourth coil 831 may be disposed outside or inside the second coil 421. For example, although not shown, the fourth coil 831 may be disposed outside or inside the third coil 431.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a battery;
a charging circuit; and
a circuit board configured to be electrically connected to the charging circuit, the circuit board comprising a first portion and a second portion disposed adjacent to the first portion,
wherein a first coil, a second coil, and a resonance coil are disposed in the first portion of the circuit board, the first coil being disposed outside the second coil, and the resonance coil being disposed inside the second coil,
wherein a third coil and a resonance capacitor are disposed in the second portion of the circuit board,
wherein the resonance capacitor is disposed inside the third coil, and
wherein the resonance coil and the resonance capacitor are electrically connected to each other to generate a designated resonance.

2. The electronic device of claim 1,
wherein the first coil is a first antenna for wireless charging in a magnetic resonance method, and
wherein the second coil is a second antenna for wireless charging in an electromagnetic induction method.

3. The electronic device of claim 1, wherein a distance between innermost patterns of the resonance coil and the second coil is greater than 2 mm and less than 30 mm.

4. The electronic device of claim 1, wherein the designated resonance comprises resonance of 1 MHz.

5. The electronic device of claim 1, wherein the resonance coil is disposed adjacent to a center of the second coil.

6. The electronic device of claim 2,
wherein the first coil operates in a designated high frequency band for wireless charging in the magnetic resonance method, and
wherein the second coil operates in a designated low frequency band for wireless charging in the electromagnetic induction method.

7. The electronic device of claim 1, further comprising a fourth coil configured to be disposed outside the third coil and operate as an antenna for near field communications (NFC) communication,
wherein the third coil is a third antenna for magnetic secure transmission (MST) communication, and
wherein a distance between innermost patterns of the third coil and the fourth coil is greater than or equal to 1 mm.

8. The electronic device of claim 1, wherein a distance between innermost patterns of the second coil and the first coil is greater than or equal to 2 mm.

9. The electronic device of claim 1, wherein the resonance coil and the resonance capacitor are not electrically connected to the first coil to the third coil.

10. The electronic device of claim 1, wherein the circuit board further comprises at least one line that is disposed to extend from the first portion to the second portion and connect the resonance coil and the resonance capacitor.

11. A circuit board on which a coil for wireless charging of an electronic device is disposed, the circuit board comprising:
- a first portion and a second portion disposed adjacent to the first portion,
- wherein a first coil, a second coil, and a resonance coil are disposed in the first portion,
- wherein the first coil is disposed outside the second coil and the resonance coil being disposed inside the second coil,
- wherein a third coil and a resonance capacitor are disposed in the second portion,
- wherein the resonance capacitor is disposed inside the third coil, and
- wherein the resonance coil and the resonance capacitor are electrically connected to each other to generate a designated resonance.

12. The circuit board of claim 11,
- wherein the first coil is a first antenna for wireless charging using a magnetic resonance method, and
- wherein the second coil is a second antenna for wireless charging using an electromagnetic induction method.

13. The circuit board of claim 11, wherein a distance between innermost patterns of the resonance coil and the second coil is greater than 2 mm and less than 30 mm.

14. The circuit board of claim 11, wherein the designated resonance comprises a resonance of 1 MHz.

15. The circuit board of claim 11, wherein the resonance coil is disposed adjacent to a center of the second coil.

16. The circuit board of claim 12,
- wherein the first coil operates in a designated high frequency band for wireless charging in the magnetic resonance method, and
- wherein the second coil operates in a designated low frequency band for wireless charging in the electromagnetic induction method.

17. The circuit board of claim 11, further comprising a fourth coil configured to be disposed outside the third coil and operate as an antenna for near field communications (NFC) communication,
- wherein the third coil is a third antenna for magnetic secure transmission (MST) communication, and
- wherein a distance between innermost patterns of the third coil and the fourth coil is greater than or equal to 1 mm.

18. The circuit board of claim 11, wherein a distance between innermost patterns of the second coil and the first coil is greater than or equal to 2 mm.

19. The circuit board of claim 11, wherein the resonance coil and the resonance capacitor are not electrically connected to the first coil to the third coil.

20. The circuit board of claim 11, further comprising at least one line that is disposed to extend from the first portion to the second portion and connect the resonance coil and the resonance capacitor.

21. The circuit board of claim 11, wherein at least one of the resonance coil or the resonance capacitor that is not electrically connected to a connector, generates resonance of a designated band.

22. The circuit board of claim 11, wherein the circuit board on which the coil for wireless charging is disposed is positioned at a center of the electronic device.

* * * * *